June 30, 1970 G. J. VOGEL 3,518,669
TIME SCANNED ARRAY RADAR
Filed Sept. 20, 1968 5 Sheets-Sheet 5

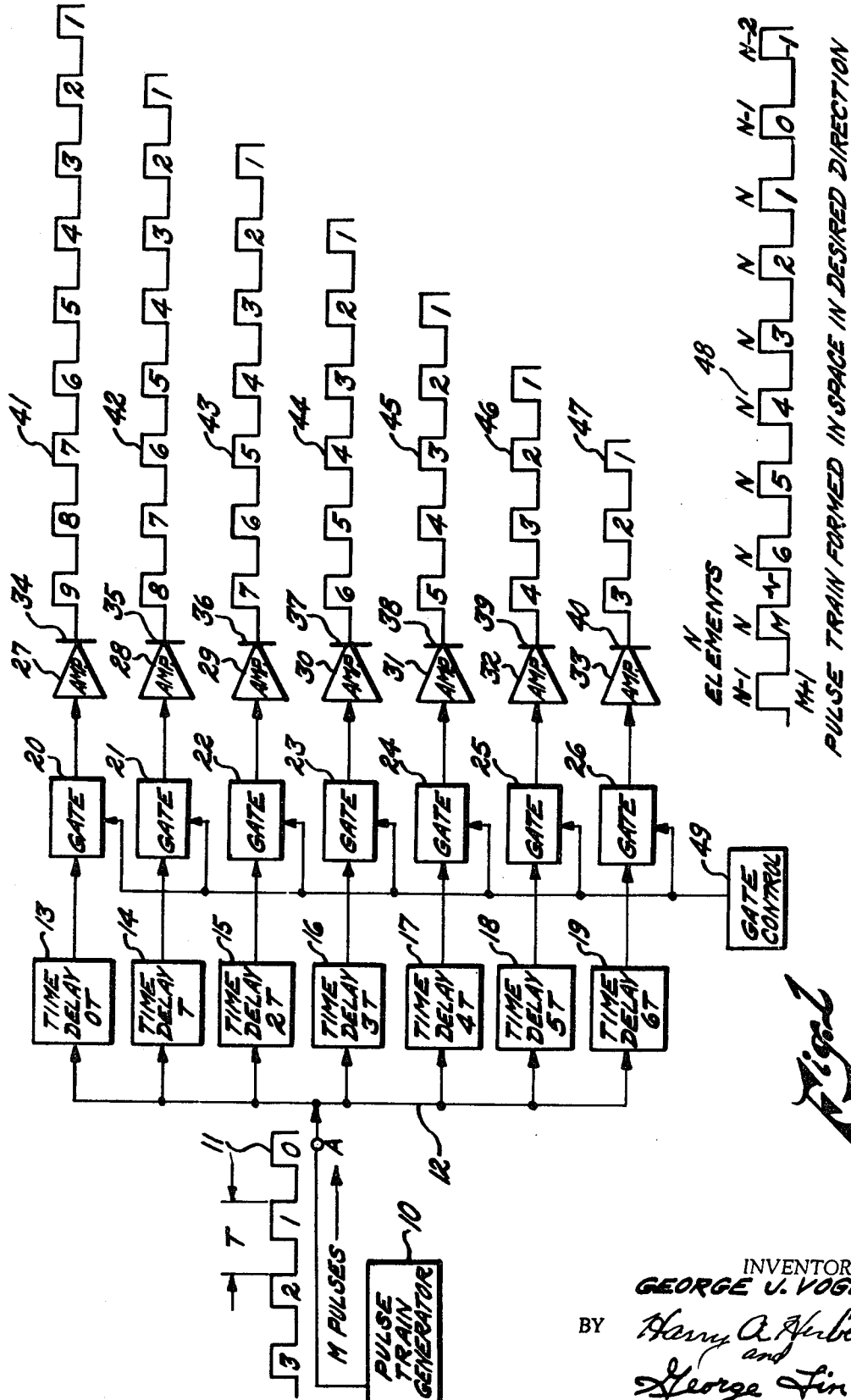

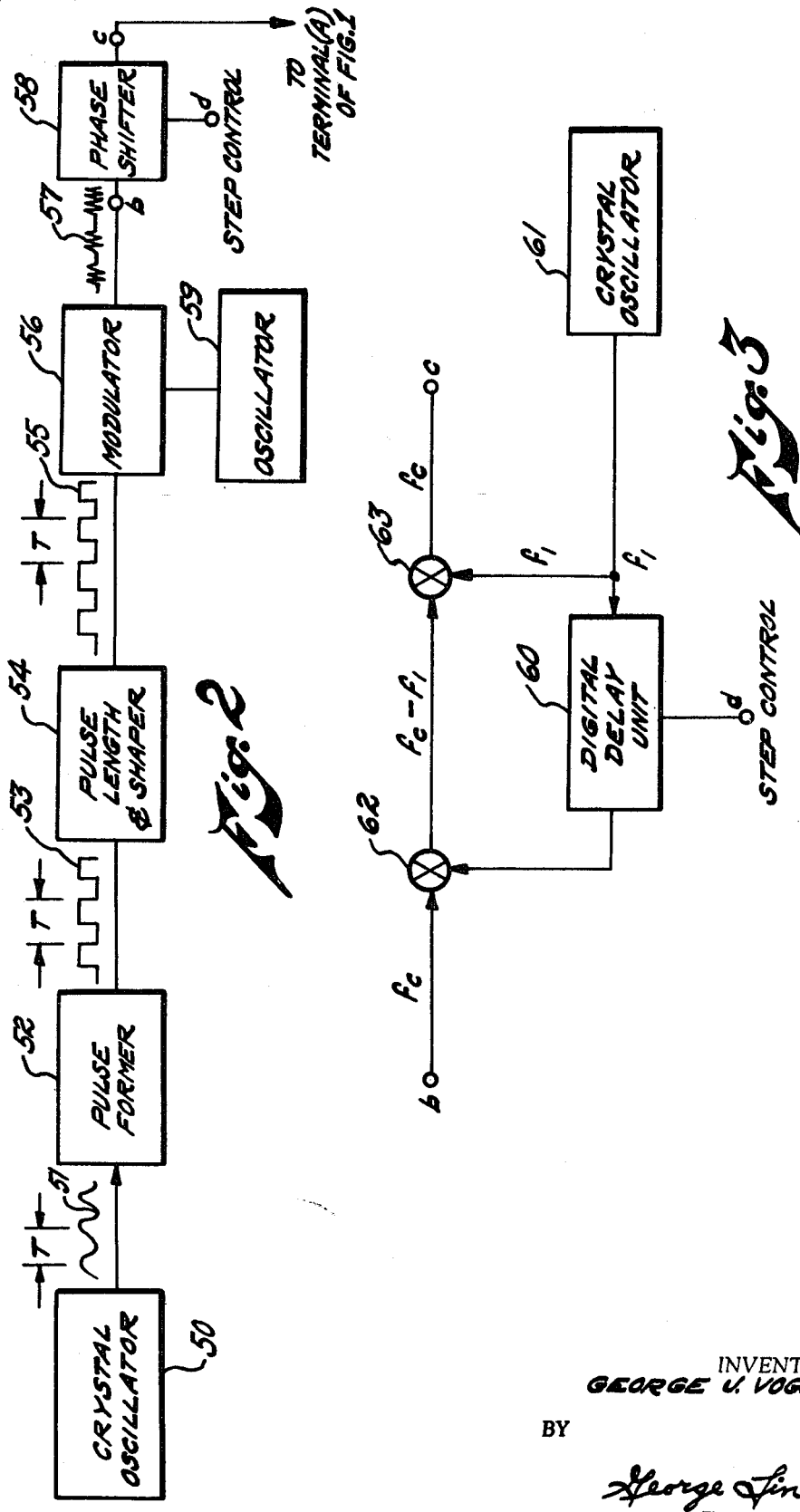

INVENTOR.
GEORGE J. VOGEL
BY
George Line
ATTORNEYS

United States Patent Office 3,518,669
Patented June 30, 1970

3,518,669
TIME SCANNED ARRAY RADAR
George J. Vogel, Blossvale, N.Y., assignor to the United States of America as represented by the Secretary of the Air Force
Filed Sept. 20, 1968, Ser. No. 761,109
Int. Cl. G01s 9/02; G01q 3/26
U.S. Cl. 343—16                2 Claims

ABSTRACT OF THE DISCLOSURE

A time scanned array radar in which an array is steered by generating a series of pulses which have their relative phase and their interpulse spacing accurately controlled.

BACKGROUND OF THE INVENTION

This invention relates to a radar having a beam electronically steered and, more particularly, to a time scanned array radar.

Phased array radars form a beam in the direction determined by the relative phase of the R.F. carrier at each element of the array. A phase steered array controls only the relative phase of the R.F. carrier and provides no control over the pulse envelope. This causes the R.F. carrier to add in phase in the desired direction, θ, but does not provide time coincidence in the direction θ of the pulse envelopes emitting from each element of the array. This causes the envelope of the summed signal to be distorted from that radiating from a single element. If time delay units are substituted for the phase shift units, the pulse envelopes emitting from each element will be delayed a sufficient quantity to provide time coincidence in the desired direction as well as phase coherence.

SUMMARY OF THE INVENTION

Time scanned array radar of this invention is an array which is steered by generating a series of pulses which have their relative phase and their interpulse spacing accurately controlled. Each element contains a fixed delay line, the length of which is a linear function of the position of the element in the array and not the direction to which the array is steered. The pulse train is radiated from all elements without any change. The fixed delays are such that at the nth element, the first pulse of the pulse train is radiated at the same time the nth pulse is radiated from the first element. The relative phases of these pulses will determine the array beam direction. If each pulse of the pulse train has a relative phase corresponding to the phase required at each element for a particular direction, then the array forms a beam in the desired direction. Each element of the array radiates a pulse train with the same pulse phase gradient, but displaced in time. The sum of these pulse trains is another pulse train with the same relative pulse to pulse phase gradient. If a receiver array is arranged the same way, with the same fixed delays, then it will automatically sum the received pulse train coherently if it is received from a direction corresponding to the pulse to pulse phase gradient. Instead of providing a pulse to pulse gradient, the interpulse period can be increased or decreased by an amount equal to the element to element time delay required for a particular beam direction. This then results in a true time delay controlled phased array radar.

It is noted that there are no active devices at the element level of the array. All receive beams are formed simultaneously, are provided in one outlet and are identified by a pulse to pulse code. This time code is provided by the transmitter. The invention can be used to provide true time delay or ordinary phase control using the same equipment.

This invention eliminates the need of thousands of control devices and complex control distribution networks. It provides the array with wide bandwidth capability and eliminates the need of switching matrices on receive, or duplication of the receiver system for simultaneous multiple receive beams.

The present invention can be used in phased array radars for use in ballistic missile defense, satellite surveillance and identification, and aircraft control. It can be used wherever there is complex requirement for surveillance, tracking, identification, etc. of aircraft, ballistic missiles, or satellites.

The subject matter which I regard as my invention is particularly pointed out and distinctly claimed in the concluding portion of this specification. The invention, however, both as to organization and method of operation, together with further objects and advantages thereof, may best be understood by reference to the following description taken in connection with the accompanying drawings.

BRIEF DESCRIPTION OF THE DRAWINGS

FIG. 1 shows a block diagram of the time scanned array radar of the present invention with the associated pulse train in space in the desired direction;

FIG. 2 shows a block diagram of the pulse train generator utilized for FIG. 1;

FIG. 3 shows a block diagram of a phase shifter to be utilized with the block diagram of FIG. 2;

DESCRIPTION OF THE PREFERRED EMBODIMENTS

Figure 4:
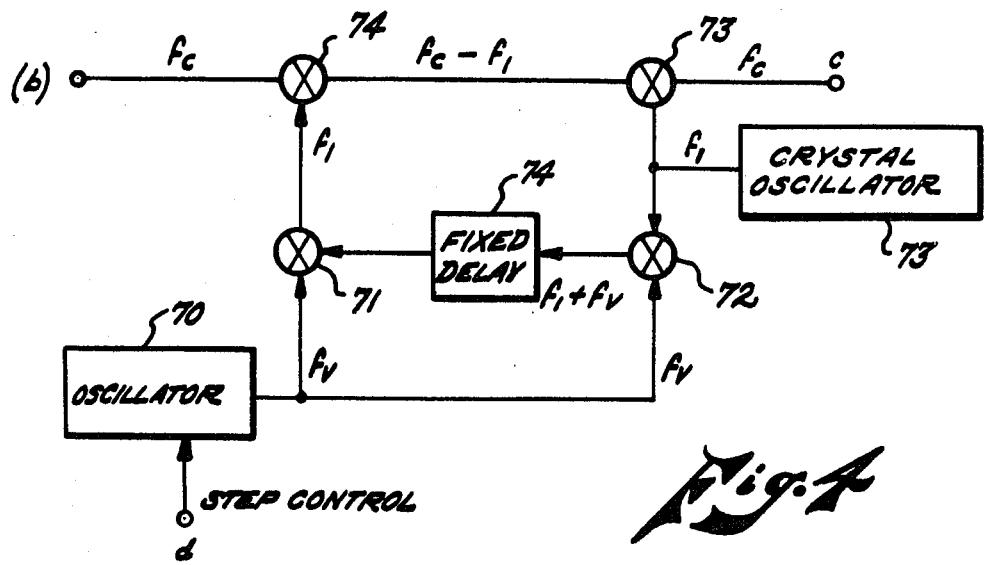
FIG. 4 shows one version of an analog phase shifter.

Now referring in detail to FIG. 1 which illustrates the time scanned radar when used as a phase controlled array. Pulse train generator 10 provides M pulse train 11 which is fed to input terminal A and then by line 12 to time delays 13–19. The respective outputs of time delays 13–19 are fed to their corresponding antennas 34–40 by way of their corresponding gates 20–26 and power amplifiers 27–33, respectively. Antennas 34–40 provide pulse trains 41–47, respectively, which results in pulse train 48 which is the pulse train in space in the desired direction. Time delays 13–19 have delays 0T to 6T, respectively. Gate control 49 provides a control voltage to switch on all gates 20–26 at the same time.

In a more detailed description of the mode of operation of the system of FIG. 1, a fixed delay is in the signal path of each element. This delay has a different value from element to element, and is a linear function of the position of the element in the array. A gate is provided after the fixed delay and before the power amplifier in each element. This gate is not necessary to the operation of this system, but provides some improvement and flexibility. All the gates are switched at the same time. The use of the gate will be explained later.

At input terminal A of the array M pulse train 11 is provided. The period T, of the pulse train is the same as the T in fixed delays 13–19.

M pulse train 11 is split and sent to each radiating element through the fixed delays. The pulse trains are radiated from each element in the array without any change as shown in FIG. 1, except for the time delay caused by the delay constants in each signal path. In the first element, including antenna 34, the pulse train is undelayed.

From the second element, including antenna 35, the pulse train is delayed one pulse period. Each successive element delays the pulse train one additional pulse period. At a given instant of time, a different pulse in the pulse train is radiating from each element represented by a column of the pulses. To steer the array, a phase gradient must be provided in these pulses. The phase of pulse #1 must be different from each of the other pulses. This is provided by inserting a pulse to pulse phase gradient on the pulse train at the input to the array. Pulse train 48 illustrates the summed pulse train in space. The N represents the number of elements in the array. The figures at the top of the pulse train represent the number of elements contributing to that pulse. The figures below the pulse train represent a numbering sequence for the pulse train where M is the number of pulses at the input to the array; by activating all the gates 20–26 in the array at the same time, the radiated pulse train can be started and stopped at any place and any of the pulses can be eliminated. By eliminating any pulses in the radiated pulse train that are not formed by all the elements in the array, the efficiency of the array is improved. This resultant pulse train in space has the same pulse to pulse phase gradient as the original at the input to the array. In the desired direction, all the pulses in a column are in phase. Each successive column changes the phase by one increment. On receive, the process is reversed, and a single pulse train is formed at the output, with the same pulse to pulse phase gradient as before.

Now referring to FIG. 2, there is shown a block diagram of the pulse train generator 10 of FIG. 1. Crystal oscillator 50 generates sine wave 51 whose period equals T. This is then fed to pulse former 52 whose output is square waveform 53. The next step is to shape the pulse to the desired shape and length by pulse length and shaper 54. This resultant pulse train 55 is used to modulate an R.F. carrier provided by oscillator 59 in modulator 56 to provide waveform 57. If the pulse train period is some whole multiple of the period of the R.F. carrier frequency, then phase shifter 58 just has to insert the required phase shift for the desired direction. Otherwise, the pulse train will already have some known pulse phase gradient, and this will have to be considered when determining the control signals (shown as step control at terminal d of phase shifter 58) for the phase shifter.

Now referring to FIG. 3, this shows a block diagram of phase shifter 58 of FIG. 2. This uses a digital relay unit as the basic phase shift control. The points b, c, and d in the block diagram of the phase shifter are the same points in the pulse train generator block diagram of FIG. 2. Referring to FIG. 3, conventional digital delay unit 60 is stepped in phase during the time between pulses by a stepped signal received at point d. The stepped signal may be supplied by any conventional stepped signal source and may be part of the radar system such as from a computer as indicated in the legend at point d of FIG. 7. A signal having frequency, $f_1$, provided by crystal oscillator 61, is sent through digital delay unit 60 and also to mixer 63. The output of digital delay unit 60 is sent to mixer 62 and combined with the modulated R.F. carrier frequency $f_c$. Either the sum or difference frequency is selected and sent to the second mixer 63 which also has the undelayed $f_1$ frequency as an input. The carrier frequency $f_c$ is selected at the output of the second mixer 63. The frequency $f_1$ has now been phase shifted an amount equal to the difference in the two paths for the frequency $f_1$. Digital delay unit 60 is then stepped to a new value for the next pulse of the pulse train.

FIG. 4 shows one version of an analog phase shifter which may be utilized for the phase shifter of FIG. 1, the points b, c, and d being the same as before with the exception that the delay unit is fixed and the frequency passing through the delay unit is varied. The resultant phase shift is a function of the frequency and the difference in the two path lenghts involving the frequency.

There is shown variable oscillator 70 receiving a step control signal by way of point d. Oscillator 70 provides a signal frequency $f_v$ which is fed simultaneously to mixers 71 and 72. Crystal oscillator 73 provides a signal of frequency $f_1$ which is simultaneously fed to mixers 73 and 72. The output of mixer 72 having frequency of $f_1+f_v$ is passed through fixed delay to mixer 71. The output of mixer 71 is fed to mixer 74. Mixer 74 also receives from point b a signal of frequency $f_c$. The output of mixer 74 is fed to mixer 73 and the output of mixer 73 is present at point c. The frequencies of the various signals are as indicated.

Figure 5:
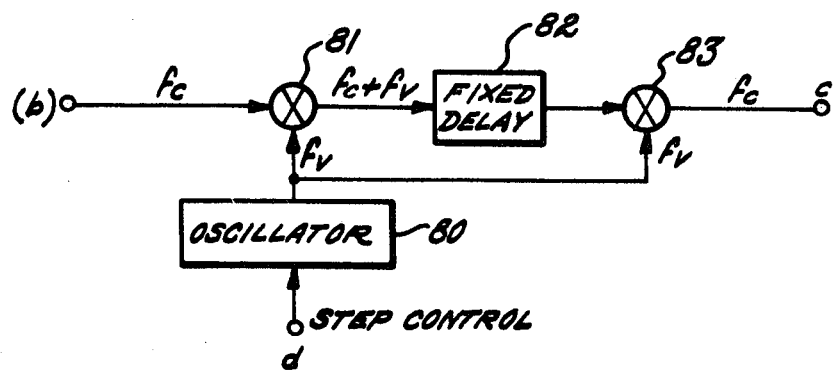
FIG. 5 shows a second version of an analog phase shifter.

FIG. 5 shows a second version of an analog phase shifter. In one of the versions, the delay unit is in the R.F. path and in the other, it is outside the R.F. path. The points b, c, and d are the same as for the previous version. There is shown variable oscillator 80 receiving a step control signal from point d. The output of oscillator 80 has a frequency $f_v$ and it is fed simultaneously to mixers 81 and 83. Mixer 81 also receives a signal of frequency $f_c$ from point b. The output of mixer 81, having a frequency $f_c+f_v$, is fed through fixed delay 82 to mixer 83 which provides an output at point c of a frequency as indicated.

Figure 6:
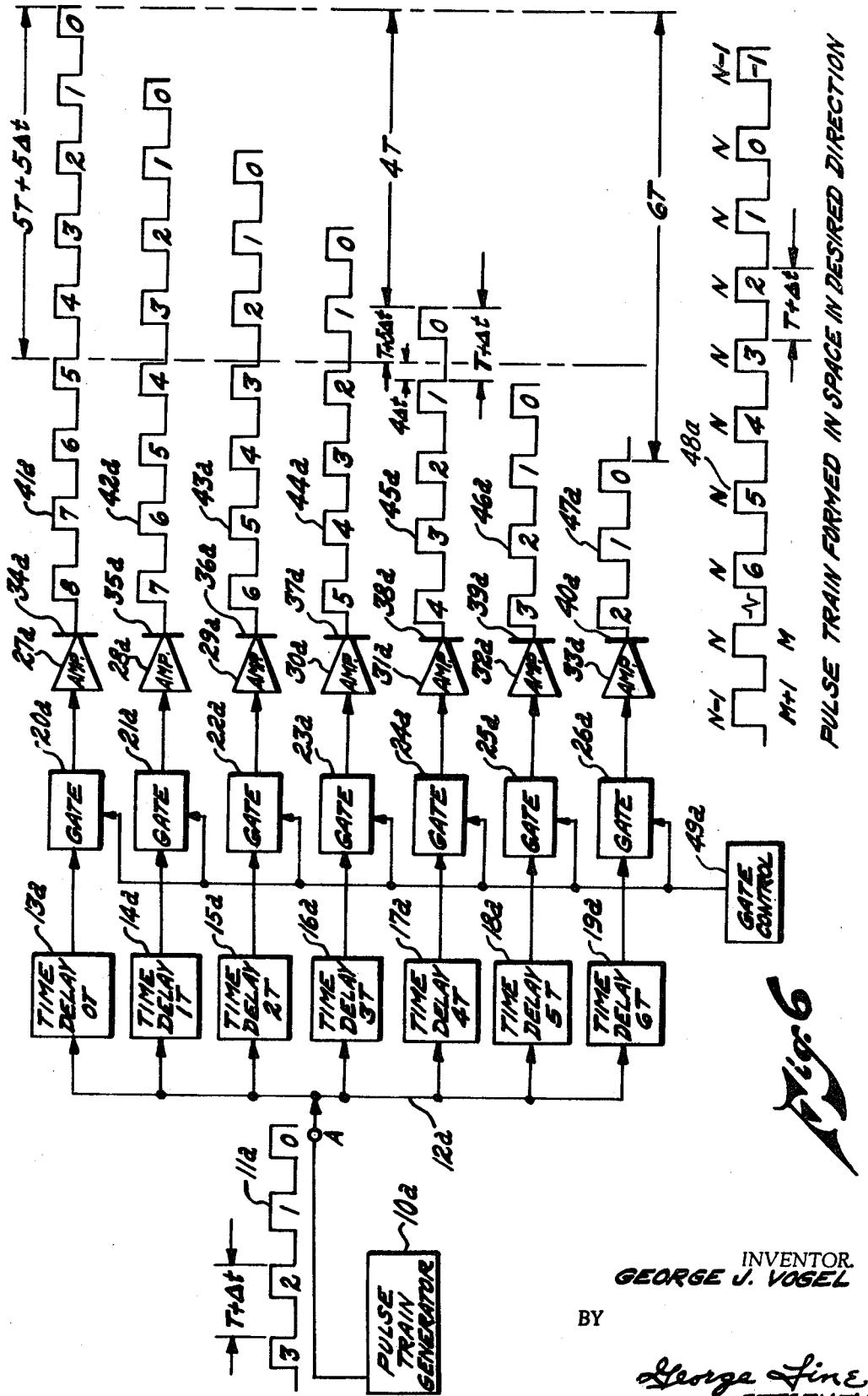
FIG. 6 illustrates the time scanned array radar of the present invention when used as a true time delay system.

Now referring to FIG. 6, there is illustrated the time scanned array radar of this invention when used as a true time delay system. In this embodiment, the pulse train period is changed to a new value of $T+\Delta t$, $\Delta t$ can be negative. The rest of the array system is the same as shown in FIG. 1. However, out in space, the pulse trains emitting from each element are shifted in their relative positions. Again, the first element doesn't delay the signal as shown in pulse train 41a. The second pulse train 42a is delayed by an amount equal to T, so that the two pulses in any column are separated in time by an amount equal to $\Delta t$. The next train 43a is delayed by 2T. The first pulse in this train is shifted from the third pulse in the undelayed train by an amount equal to $2\Delta t$. In any vertical column, a time delay gradient of $\Delta t$ is provided across the array as indicated in pulse trains 41a through 47a. This delay gradient corresponds to some direction $\theta$. The summed pulse train 48a has a pulse to pulse period of $T+\Delta t$, the same as the input train 11a. On receive, the same thing happens in reverse and a single pulse train is formed at the output. The gates are used as for FIG. 1, to eliminate any undesired pulses before being radiated.

Figure 7:
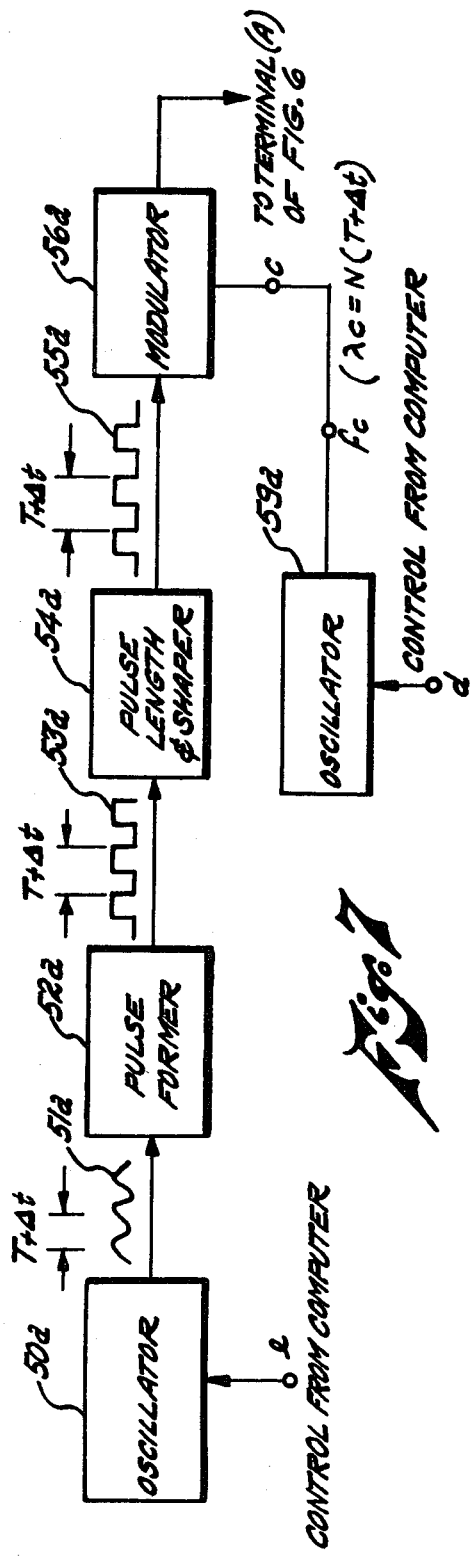
FIG. 7 shows a block diagram of the pulse train generator utilized for FIG. 6.

FIG. 7 shows block diagram for pulse train generator 10 of FIG. 6. It is the same as for FIG. 2 with the exception that the input frequency from oscillator 50a is varied under control of a signal from an array computer received at point e. The variation is such that its period corresponds to the desired period, $T+\Delta t$. Thus there is provided means for varying the interpulse period of the train of pulses by an amount equal to the radiating element to radiating element time delay required for a particular direction of the radar beam. Also, the carrier frequency provided by oscillator 59a is varied by a signal received at point d from the array computer for each direction such that its wavelength $\lambda c$ equals a whole multiple of the interpulse period, $T+\Delta t$. If this is not done, then a pulse to pulse phase gradient is also imposed on the pulse train which has to be removed.

Figure 8:
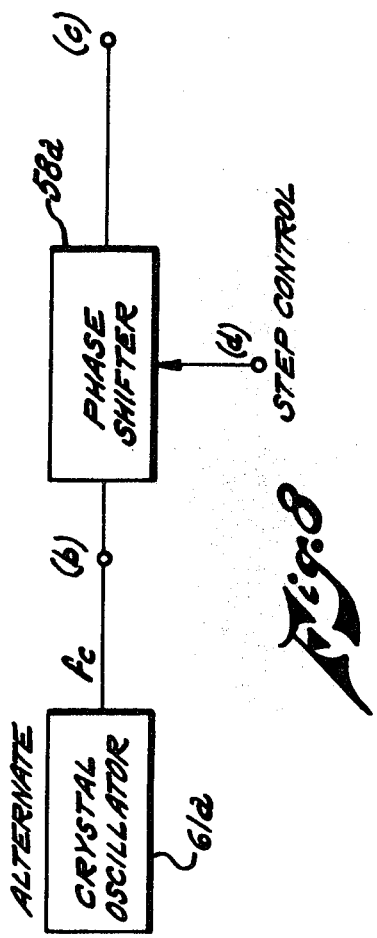
FIG. 8 shows a block diagram of a phase shifter to be utilized with the block diagram of FIG. 7.

Now referring to FIG. 8, an alternate for the block diagram is shown. This alternate is identical to the phase shifter of FIG. 3 but whose purpose is to remove a pulse to pulse phase shift instead of to impose a pulse to pulse phase shift. Crystal oscillator 61a provides a frequency of $f_c$ which is fed to phase shifter 58a. Phase shifter 58a also receives a step control signal by way of point d. The output of phase shifter 58a is fed to point c. The phase shifter may be inserted between points b, c, and d in FIG. 7.

While I have shown and described embodiments of my invention, it will be apparent to those skilled in the art that many other changes and modifications may be made without departing from my invention in its broader aspects; and I therefore intend the appended claims to cover all such changes and modifications as fall within the true spirit and scope of my invention.

What I claim as new and desire to secure by Letters Patent of the United States is:

1. A time scanned array radar to electronically control the direction of the beam therefrom comprising means to generate a train of pulses having their relative phase and their interpulse spacing accurately controlled, a multiplicity of radiating elements, a fixed delay line in the conductive path from said train of pulse generating means to each of said radiating elements, the length thereof being a linear function of the position of the radiating element in the array, said fixed delay being such that at the $n$th radiating element, the first pulse of said train of pulses is radiated at the same time the $n$th pulse is radiated from the first radiating element, and means to selectively control each pulse of said train of pulses to provide a relative phase corresponding to the phase required at each radiating element for a particular direction of said beam with each radiating element of the array radiating a pulse train with the same pulse to pulse phase gradient but displaced in time.

2. A time scanned array radar to electronically control the direction of the beam therefrom comprising means to generate a train of pulses having their relative phase and their interpulse spacing accurately controlled, a multiplicity of radiating elements, a fixed delay line in the conductive path from said train of pulse generating means to each of said radiating elements, the length thereof being a linear function of the position of the radiating element in the array, said fixed delay being such that at the $n$th radiating element, the first pulse of said train of pulses is radiated at the same time the $n$th pulse is radiated from the first radiating element, and said means to generate a train of pulses having their relative phase and their interpulse spacing accurately controlled being comprised of means to generate a train of pulses with the period of the pulse train being preselected, said pulse train having a predetermined pulse repetition frequency, and single means to shift the phase of each pulse of said pulse train a predetermined amount and in sequence in accordance with said predetermined pulse repetition frequency.

References Cited

UNITED STATES PATENTS

| | | | |
|---|---|---|---|
| 3,295,138 | 12/1966 | Nelson | 343—100 XR |
| 3,356,989 | 12/1967 | Autrey | 343—100 XR |
| 3,400,405 | 9/1968 | Patterson | 343—100 XR |

RODNEY D. BENNETT, Primary Examiner

M. F. HUBLER, Assistant Examiner

U.S. Cl. X.R.

343—854